ELECTRON DISCHARGE DEVICE WITH HELIX-TO-WAVEGUIDE COUPLING MEANS

Filed Feb. 27, 1963 2 Sheets-Sheet 1

INVENTOR.
RICHARD H. OHTOMO
BY Harry E. Aine
ATTORNEY

INVENTOR.
RICHARD H. OHTOMO
BY
Harry E. Aine
ATTORNEY 3,280,362
ELECTRON DISCHARGE DEVICE WITH HELIX-TO-WAVEGUIDE COUPLING MEANS Richard H. Ohtomo, Mountain View, Calif., assignor to Varian Associates, Palo Alto, Calif., a corporation of California
Filed Feb. 27, 1963, Ser. No. 261,362
14 Claims. (Cl. 315—3.6)

Figures 1, 2:
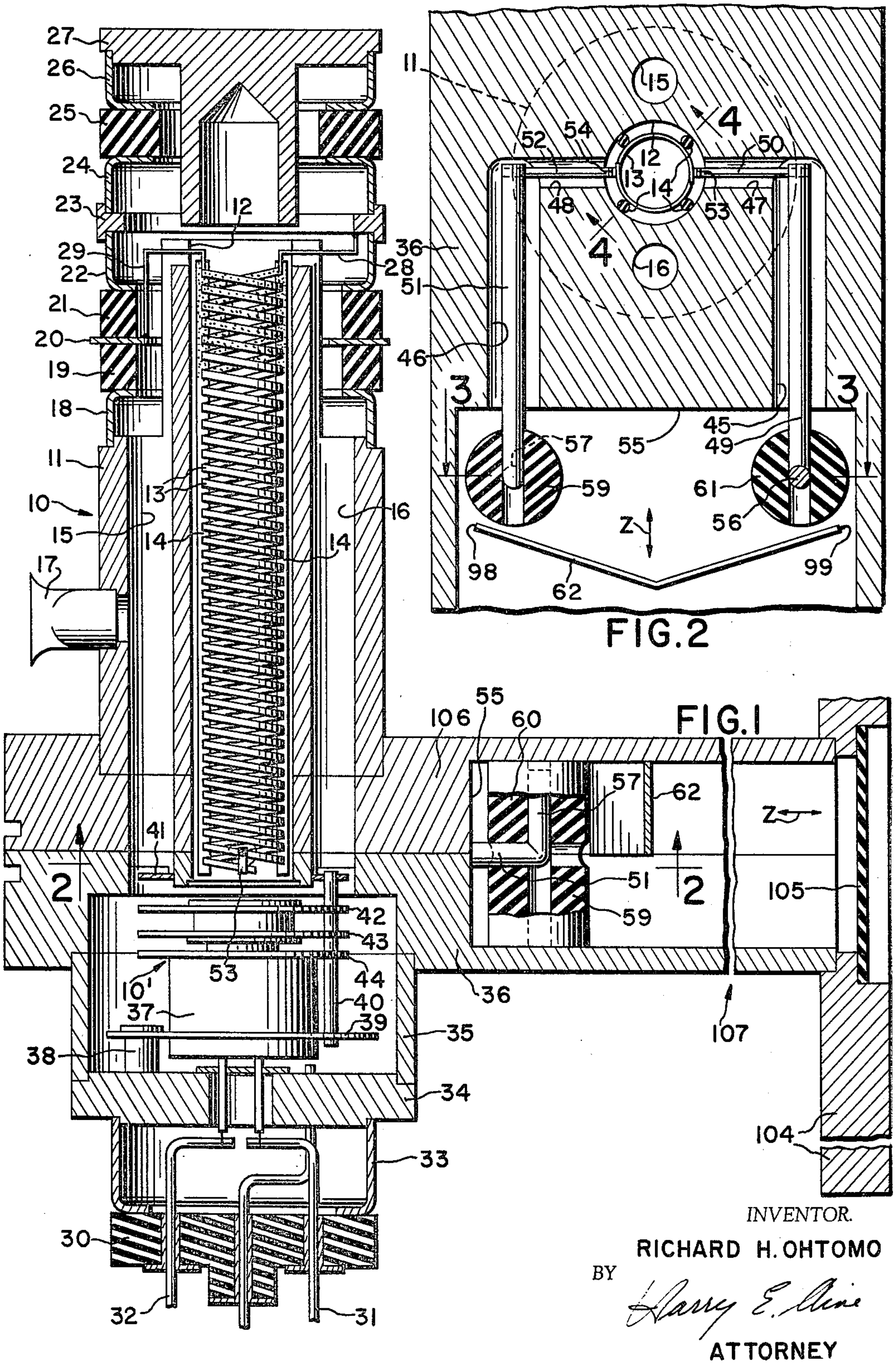

This invention relates in general to high frequency electron discharge devices of the traveling wave type and more particularly to such devices operating as backward wave oscillators and/or amplifiers.

Modern communication systems are constantly demanding wider frequency ranges and faster methods of tuning electron discharge devices for utilization in, for example, radar as local oscillators, signal generators and other related high frequency applications. Additional requirements are lightweight, ruggedness and frequency stability under adverse operating conditions. Backward wave oscillators are peculiarly suited to meet the above-mentioned criteria and the present invention represents a definite advance in the art.

It has long been recognized that the backward wave oscillator could provide broad electronic tuning range with extremely rapid electronic tuning rates. However, the realization of a practical tube having the above-mentioned characteristics coupled with practical R.F. coupling means from an electrostatically focused bifilar helix slow wave circuit, suitable electrostatically focused bifilar helix slow wave structural supporting techniques, reflected backward wave mode suppression means and adequate shielding means for protecting the electron beam from stray magnetic fields has heretofore gone unrealized. The present invention has resulted in a successful solution of the above design criteria.

It is, therefore, the object of the present invention to provide a novel electron discharge device of the traveling wave type which incorporates the above-mentioned improvements and advantages.

A feature of the present invention is the provision of a novel supporting structure and mode suppression means for an electrostatically focused multifilar helix slow wave structure.

Another feature is the provision of a novel output coupling means for an electrostatically focused bifilar helix slow wave structure operating in the anti-symmetric mode wherein the out-of-phase powers are coupled from the bifilar helix to an output waveguide.

Another feature of the present invention is the provision of a novel supporting structure of an electrostatically focused bifilar helix slow wave structure operating in the anti-symmetric mode and coaxial output coupling means therefore.

Another feature of the present invention (both individually and in combination) is the provision of a novel supporting structure for an electrostatically focused backward wave oscillator having a bifilar helix slow wave structure operating in the anti-symmetric backward fundamental mode together with novel means for stabilizing the average voltage seen by an electron beam as it traverses the bifilar helix and wherein reflected backward wave mode suppression means coupled with a tube main body of magnetic material are incorporated together with novel output coupling means having optimum impedance matching properties for the particular coupled design and axially directed outgassing channels extending through the main body.

Still another feature of the present invention is the provision of a novel coaxial to waveguide coupling means.

Figure 3:
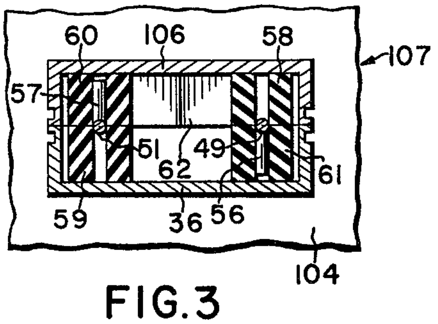
Figure 4:
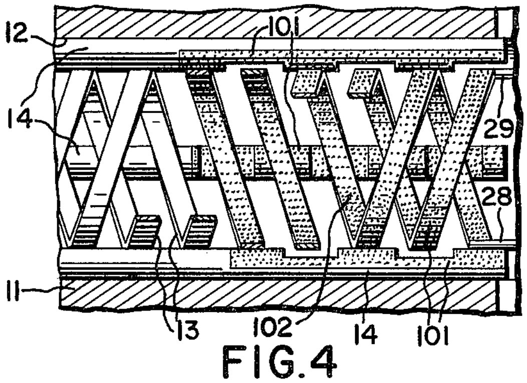
Figures 5, 6, 7:
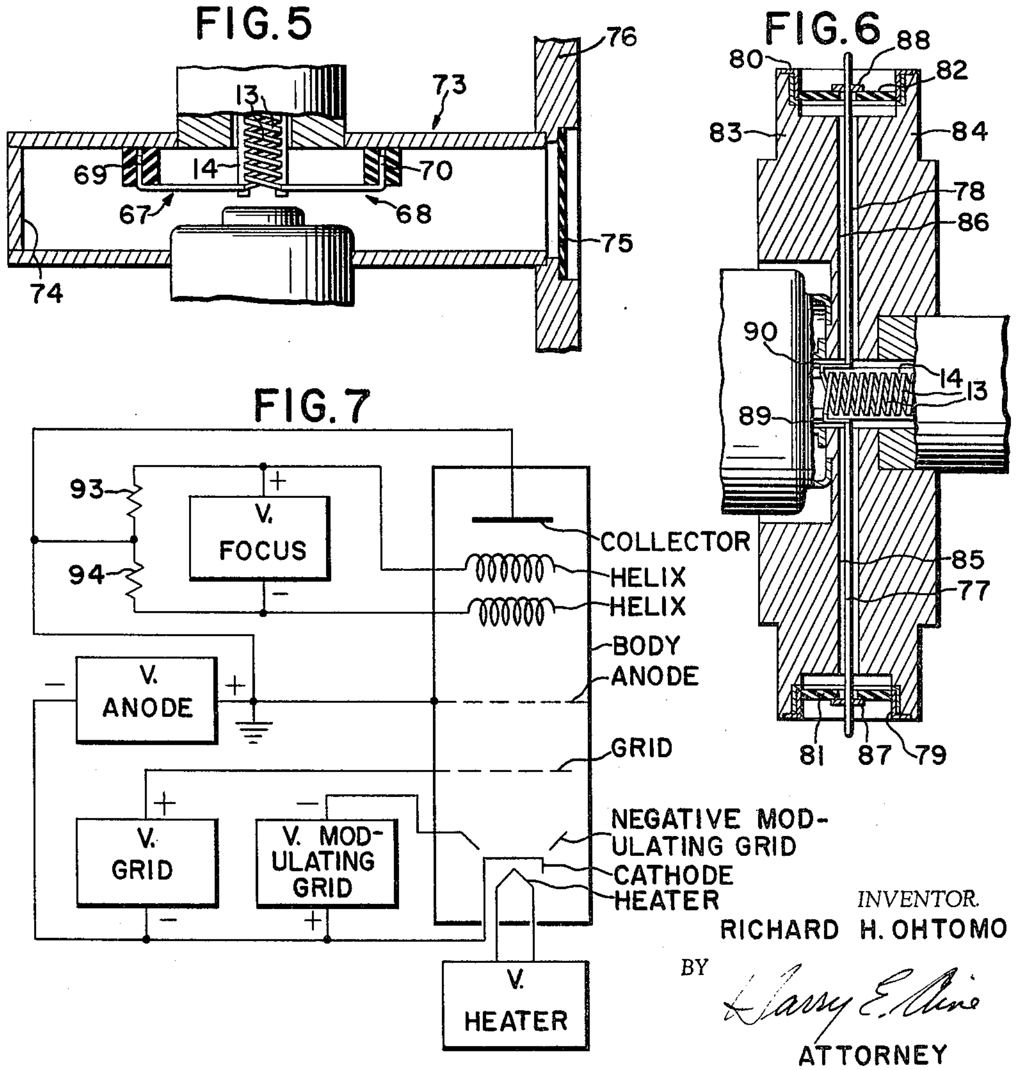

These and other features and advantages of the present invention will be more apparent after a perusal of the following specification taken in connection with the accompanying drawings wherein, FIG. 1 is a longitudinal cross-sectional view partly in elevation of a backward wave oscillator incorporating the novel features of the present invention therein, FIG. 2 is a cross-sectional view taken along the lines 2—2 of FIG. 1 rotated clockwise 90° depicting the novel coaxial to waveguide coupling means of the present invention, FIG. 3 is a reduced cross-sectional view taken along the lines 3—3 of FIG. 2 depicting the orientation of and the supporting means for the coaxial to waveguide antenna couplers, FIG. 4 is a fragmentary longitudinal elevational view partially cut away taken along lines 4—4 of FIG. 2 of the novel supporting means and reflected backward wave mode suppression means at the collector end of the electrostatically focused bifilar helix slow wave circuit of the present invention, FIG. 5 is a fragmentary sectional view partially in elevation of an alternative coupling scheme for combining the out-of-phase powers of the electrostatically focused bifilar helix slow wave structure of the present invention directly in the output waveguide, FIG. 6 is a fragmentary cross-sectional view partially in elevation of an alternative coaxial to waveguide coupling scheme for an electrostatically focused bifilar helix slow wave circuit particularly adapted for driving balanced loads, FIG. 7 is a schematic diagram of the power supply and control system for the traveling wave tube of FIG. 1 for operation as a backward wave oscillator or amplifier.

Referring now in more detail to FIGS. 1–7, an electrostatically focused backward wave oscillator tube 10 having a cylindrically shaped main body portion 11 preferably of cold rolled steel is shown therein. The main body portion 11 has a central axially directed bore 12 within which a bifilar helix 13 preferably of molybdenum is supported by means of four 90° space oriented rods 14, partially notched along the length thereof, preferably of sapphire or other suitable materials such as alumina.

Main body portion 11 has two additional axial bores 15, 16 extending along the length of the main body portion between the gun and collector as shown which serve as channels for a gaseous exhaust products pumped out of exhaust tubulation 17 during tube processing operations. The utilization of multiple axially directed channels or bores such as 15, 16 provide a means for channeling the gaseous exhaust products from the gun and collector end, as well as the internal main bore and slow wave circuit, out through exhaust tubulation 17 in a manner which does not cause perturbation of the electromagnetic fields on the slow wave structure which would occur if the exhaust bore were extended into the main bore wherein the slow wave structure is supported.

A vacuum tight construction is achieved as indicated hereinafter. A cup-like member 18 preferably of Kovar having a central aperture therein is brazed to the collector end of the main body portion 11 as depicted in FIG. 1. An annular insulating ring 19 preferably of alumina is brazed on one end portion thereof to the inwardly directed flange portion of cup 18 as shown. A metallic ring-like annular member 20 preferably of Kovar is affixed as by being brazed or the like to the other end portion of insulator ring 19. A second insulating ring 21 preferably of alumina is brazed on one end portion thereof to metallic ring 20 and on the other end portion thereof to metallic cup-like member 22 as shown. Annular stepped ring-like member 23 preferably of Kovar having an enlarged exterior outer portion is brazed to the exterior surface of cup 22 on one end portion thereof and brazed to annular cup-like member 24 preferably of Kovar on the other end portion thereof as shown. An annular ring-like insulating member 25 preferably of alumina is brazed to the inwardly directed flanged portion of cup 24 on one end portion thereof and brazed to another cup-like member 26 preferably of Kovar on the inwardly directed flanged portion thereof. A collector member 27 of copper or the like is brazed to the interior surface of cup 26 as shown and terminates the electron beam and is insulated from the main body portion of the tube by means of ring 25.

Bifilar helix 13 is composed of two identical helices interwound in conventional fashion as best seen in FIGS. 1 and 4. Conductive leads 28 and 29 preferably of Kovar are attached on the one end thereof to the collector end diametrically opposed end portions of each of the helices of the bifilar helix 13 as shown and on the other end thereof to the conductive ring members 23 and 20 respectively. A differential D.C. voltage such as, for example, 250 volts, is applied between the helices of the bifilar helix 13. This voltage serves to provide the necessary focusing of the electron beam as it traverses the slow wave structure 13 by means of an axially directed circumferential electrostatic field generated between the helices as better described in U.S. Patent 2,834,909 by W. L. Beaver wherein an adequate description of bifilar helix backward wave oscillator and amplifier operation is also to be found.

Turning our attention to the gun 10' of the tube 10, there is shown end seal member 30 preferably of alumina having a plurality of apertures therein through which heater leads 31, 32 preferably of Kovar extend. A cup-like member preferably of Kovar 33 is brazed on its internally directed flange on the one end thereof to the one face of member 30 and on the internal end portion of the circumference thereof to a preferably cold rolled steel annular main body member end disc 34 at the other end thereof as shown. A cylindrical body member 35 preferably of cold rolled steel is brazed between disc 34 and rectangular waveguide body 36 as shown.

A cylindrical member 37 preferably of stainless steel supports the cathode and is maintained in secure fashion within the member 35 by means of support rings 39 and 41, support rod 40 preferably of sapphire and rod 38 preferably of Kovar as shown. Annular ring-like members 42, 43 and 44 preferably of molybdenum are supplied with the operating potentials for the grid, negative modulating grid and cathode, respectively, through suitable leads (not shown) extending through end disc 30. A hollow beam cathode and focusing assembly is preferably employed for generation of a hollow electron beam internally of the helix assembly for interaction with the R.F. energy on the bifilar helix.

The output power coupling technique employed in the tube of FIG. 1 will now be described with reference to FIGS. 1–3. Two rectangular cold rolled steel or the like members 36, 106 are joined in vacuum sealed relationship with the body members 11 and 35 and combine to form rectangular waveguide portion 107 as shown. Cylindrically shaped bores 45, 46 extend through the members 36, 106 at the mating surface thereof forming a cylindrical bore defined by semi-cylindrical sections as shown. Bores 45, 46 at the ends removed from waveguide portion 107 are joined by bores 47, 48, respectively, intersecting at right angles therewith as best seen in FIG. 2. Kovar or the like center conductors 49, 50 and 51, 52 are coaxially disposed within bores 45, 47 and 46, 48 respectively. Conductors 50, 52 are conductively attached by means of tabs 53, 54 preferably of nickel to diametrically opposed end portions of the helices which form bifilar helix 13. Central conductors 49, 51 extend beyond the end wall 55 into waveguide portion 107 whereupon conductors 49, 51 are terminated in antenna probes 56, 57 respectively, normally directed to the broad walls of the waveguide and oppositely directed within said waveguide as best seen in FIG. 3. Oppositely directed is hereby defined as meaning directed towards opposing waveguide walls. Probes 56, 57 are supported within waveguide portion 107 in D.C. isolation with respect thereto by means of alumina or the like apertured cylinders 58, 61 and 59, 60, respectively.

An angularly shaped capacitive iris matching plate 62 is positioned within waveguide portion 107 on one of the broad walls of the guide as shown for purposes of obtaining an optimum impedance match between the coaxial to waveguide transition.

Referring to FIGS. 1–3, and in particular to the coupling technique shown therein, the present invention provides a unique method of coupling a bifilar helix to a waveguide. A typical bifilar helix impedance at a preferred range of operation of 8.5–9.6 gc. would be around 50Ω for the tube structure of FIG. 1. In order to obtain a good power transfer (less than 20% average reflection) between the helix and the output waveguide, particular attention must be paid to obtaining the proper coaxial transitional impedance. Over the frequency range of 8.5–9.6 gc. waveguide section 107 will have an average impedance as defined by $$Z_{og}=\frac{240\pi}{\lambda}\lambda_g\left(\frac{B}{A}\right)$$

where $Z_{og}$=waveguide impedance at the center of the guide
$\lambda_g$=guide wavelength
$\lambda$=free space wavelength
$B$=waveguide narrow wall dimension
$A$=waveguide broadwall dimension of approximately 500Ω for the construction depicted in FIG. 1. In order to match this impedance to the bifilar helix impedance an average impedance of approximately 70Ω is required for the coaxial portion. Since the impedance of a waveguide tapers off from the center axis to the side walls, the antenna probes are displaced therefrom to a region having approximately 100Ω impedance over the tunable band thus facilitating the design of a good impedance matching transition. The most important factors determinative in obtaining an acceptable impedance match between the helix and the output waveguide are the following: coaxial I.D. and O.D.; spatial distance between antenna probes and shorting wall of the waveguide; probe dimensions; gap space between probe tip and opposing waveguide wall; dielectric properties of supporting cylinders for antenna probes; transverse distance of probes from side wall; dimensions, shape and spatial relationship of the iris to the probes; materials and dimensions of the waveguide, iris, helix and coaxial portions. The above list is not meant to be all inclusive but is set forth only to show the complexity in arriving at a good impedance match between the bifilar helix and the waveguide outputs. The oppositely directed antenna probes result in a combination of a simultaneous 180° relative phase shift and addition of the two 180° out-of-phase waves being propagated along the coaxial sections at the plane of the probes.

A good (less than 20% average reflection) impedance match for the coupling device depicted in FIGS. 1–3 was achieved for the operating range of 8.5–9.6 gc. taken as a preferred range of operation having a power output varying from approximately 50 milliwatts to 100 milliwatts over the tunable bands for a coupler having the following dimensional parameters, expressed in terms of waveguide mode wavelength $\lambda_g$ and coaxial mode wavelength $\lambda_o$ wherein $\lambda_g$ and $\lambda_o$ are determined from the center frequency of the desired range of operation; distance of conductors 50, 52 is approximately $\frac{1}{5}\lambda_o$, $\pm\frac{1}{10}\lambda_o$; distance of conductors 49, 51 is approximately $\frac{1}{2}\lambda_o$, $\pm\frac{1}{10}\lambda_o$: distance between a plane through antenna probes 56, 57 to tip of iris 62 is approximately $\frac{1}{5}\lambda_g$, $\pm\frac{1}{10}\lambda_g$; distance along the Z dimension of the waveguide between tip of iris 62 to a transverse plane through the end portions 98, 99 of iris 62 is approximately $\frac{1}{10}\lambda_g$, $\pm\frac{1}{20}\lambda_g$; distance between probes 56, 57 to each sidewall of the waveguide is approximately $\frac{1}{20}\lambda_g$, $\pm\frac{1}{50}\lambda_g$; diameter of ceramic support members 58–61 is approximately $\frac{1}{10}\lambda_g$, $\pm\frac{1}{5}\lambda_g$.

It is to be understood, of course, that the above-mentioned dimensional parameters are given by way of illustrating a preferred embodiment capable of achieving a good (less than 20% average reflection) power transfer between the bifilar helix and the output waveguide and encompass the entire microwave frequency spectrum. A standard vacuum sealed window 105 of alumina or the like together with a standard coupling flange 104 terminate waveguide 107.

In FIG. 5 there is depicted an alternative coupling technique for providing a single waveguide output for the anti-symmetric mode of a bifilar helix 13. Notched rods 14 are used to support the helix and the same reflected backward wave mode suppression lossy material as will be described below with reference to FIGS. 1–4 is employed in FIG. 5. The novel coupling technique utilized in FIG. 5 consists of directly coupling two antennas 67, 68 conductively attached at the diametrically opposed end portions of the two helices forming the bifilar helix 13. Antennas 67, 68 are terminated in spaced coupling probes 69, 70 having a $\frac{1}{2}\lambda_g$ distance therebetween at the center frequency of the frequency band over which the oscillator is tunable, wherein $\lambda_g$ is the waveguide wavelength. Coupling probes 69, 70 are normally oriented with respect to and directed toward the same broad wall of output coupling waveguide 73 as shown. Each probe 69, 70 is positioned within an alumina or the like supporting cylinder which is preferably brazed to the center of the same broad wall of waveguide 73. A small gap is again left between the waveguide wall and the probe tip, as shown, to provide D.C. isolation. At the center frequency of the tunable band, a $\frac{1}{4}\lambda_g$ space is left between the probe 69 and the shorting end wall 74 of waveguide 73. Thus a $\frac{1}{2}\lambda_g$ spaced probe coupling technique is provided which allows direct coupling and combining of the anti-symmetric modes of a bifilar helix within a single waveguide internally of the tube. A mica or the like waveguide window 75 is positioned within output coupling flange 76 for vacuum sealing the waveguide. The distance between the window and probe 70 is preferably $\frac{1}{16}\lambda_g$ at the center frequency of the tunable band or greater.

In FIG. 6 a coaxial output technique is depicted for a bifilar helix 13 operating in the anti-symmetric mode which is particularly useful for driving a balanced load. Again the notched supporting rods 14 and the mode suppression techniques described below with respect to FIGS. 1–4 are employed herein. Center conductors 77, 78 are coupled to diametrically opposed end portions of the helices forming the bifilar helix 13 and are securely coaxially disposed in aligned bores 85, 86 within coupling body members 83, 84 by means of being brazed to center rings 87, 88 preferably of Kovar mounted in vacuum sealed relationship on coaxial windows 81, 82 preferably of alumina which are supported in vacuum sealed relationship within flanged supporting members 79, 80 preferably of Kovar as shown. A distance of approximately $\frac{3}{4}\lambda_o$ at the center frequency of the tunable band of operation is desired between the coaxial windows 81, 82 and the internal end portions of bores 85, 86 for optimum coupling and impedance matching wherein $\lambda_o$ is defined as the coaxial mode wavelength at the center frequency of the band over which the tube is tuned. Center conductors 77, 78 extend beyond the waveguide windows and serve as coupling antennas to couple from the coaxial portions into coaxial loads or waveguide loads.

Kovar or the like leads 89, 90 are suitably coupled between the above-mentioned helix end portions and the coaxial center conductors 77, 78. Conventional hollow beam electron gun assembly and control means as utilized in FIG. 1 are also employed in FIGS. 5 and 6.

Turning our attention to FIG. 4, there is shown in detail the supporting technique employed in the present invention for obtaining D.C. isolation between the helices of the bifilar helix 13. As can be seen, each supporting rod 14 is periodically notched at the collector end over approximately ⅕ of the length thereof to provide clearance for one of the two helices. Two diametrically opposed rods of, for example, sapphire support one helix and are bonded thereto by any suitable means such as, for example, glazed thereto or the like while the other two diametrically opposed rods 14 support and are bonded thereto, as above indicated, to the other helix. Each of the rods is coated on the surfaces thereof in the vicinity of the collector end with a lossy material 101 such as, for example, Aquadag. The notched portions provide D.C. isolation between helices since the Aquadag would otherwise provide a current path between helices and the accompanying loss of the differential voltage therebetween would otherwise result in a substantial lowering of the electrostatic focusing fields. The helix itself is also provided with lossy resistive material 102 in the notched region. The rods are masked in the vicinity of the portion along the length thereof wherein the rods contact the internal tube body surface. This prevents any shorting path of lossy material along the rods and through the body to the helices of the bifilar helix from occurring during, as for example, spraying operation for coating the rods and helix with lossy material. The masking is removed after the spraying operation. Since tube body 11 is made of a conductive magnetic material, lossy material coated on the internal surface thereof would be ineffective to suppress the reflected waves due to an essentially zero electrical field at the internal surface of the main bore of body 11. The use of magnetically soft material having a high $\mu$, preferably above 1000 such as cold rolled steel for the main body material does, however, provide magnetic shielding means for the tube which permits the design of an extremely lightweight tube. The use of lossy material on the rods at the collector end and the helix at the collector end permits suppression of reflected waves in the vicinity of appreciable electrical field strength while simultaneously substantially not affecting the backward fundamental mode which is just beginning to grow at this point in space at the collector end of the tube. Thus it is readily apparent that a combination of shielding, mode suppression and electrostatic focusing techniques are present in the subject invention. Additionally, by selecting a cold rolled steel or other similar magnetically soft material, such as iron, for the main body member, the electron beam is additionally shielded from extraneous stray magnetic fields which would interfere with beam focusing as mentioned above. Thus there is provided, by the combination of proper selection of tube main body material and the utilization of notched supporting rods coupled with the use of lossy material on the rods, a lightweight, electrostatically focused, rugged, shielded backward wave oscillator having the additional advantages of suppression of reflected backward waves. It is to be noted that the supporting and mode suppression techniques described hereinabove with reference to a BWO could equally advantageously be employed in any traveling wave electrostatically focused device. This, of course, includes varying the number and position of the notches as dictated by the selected mode of operation.

In FIG. 7 a typical power supply arrangement is shown for the backward wave oscillators shown in FIGS. 1, 5 and 6.

Typical operating parameters for the tube depicted in FIG. 1 operating as a backward wave oscillator and tunable over the exemplary range of 8.5–9.6 gc. are as follows:

$V_{Focus}$=250 v. at 25 ma.
$V_{Anode}$=450–700 v. at 25 ma.
$V_{Grid}$=90 v. at 5 ma.
$V_{Modulating\ Grid}$=30 v. at 5 ma.
$V_{Heater}$=6.3 v. at 1.65 amps.

The control grid voltage determines the beam current level of operation; the anode voltage establishes the electron velocity. Electrostatic focusing is achieved by maintaining a D.C. potential difference, typically around 250 volts between the helices forming the bifilar helix. Tube operating frequency is controlled by varying the cathode to anode voltage from a range of around 450–700 v. The focusing voltage is maintained constant for operation in the 8.5–9.6 gc. range. However, a wider tuning range may be achieved by programming the focusing voltage such that it varies linearly with the tuning voltage if desired. Two bleeder resistors 93, 94 of a value preferably of 10K ohms are shunted between ground and the focusing voltage supply to stabilize the average voltage seen by the beam as it traverses the helices. Since secondary electron emission will occur from the negatively biased helix to the positively biased helix, the bleeder resistors serve an extremely useful function as a voltage regulator to maintain a stabilized voltage between the helices during varying operating conditions. The 10K ohm values were chosen to obtain an optimum ratio between the current in the loop between the focusing voltage terminals and through resistors 93, 94 due to the focusing voltage and the current in resistors 93, 94 attributable to secondary emission. It has been determined that for resistance values of around 10K ohms that the current introduced into resistors 93 or 94 from secondary emission effects will be negligible and will not adversely affect the stability of the average voltage seen by the beam as it traverses the helices, namely the anode voltage. The tubes depicted in FIGS. 1–6 additionally have a high impedance negatively biased modulating grid which is quite suitable for modulation purposes. This grid is preferably kept at cathode potential for continuous-wave (C.–W.) operation.

A typical backward wave oscillator tube of the type shown in FIG. 1 and having a tunable range of 8.5–9.6 gc. has been constructed and operated with demonstrably low noise, low spurious outputs and smooth power output at low operating voltages and having overall dimensions of 3¼ x 2 x 1¾ inches and an 8 oz. weight.

It is to be understood that the aforementioned materials and metal joining techniques, as well as the operating parameters and range of operation, are not to be taken in a limiting sense but only for purposes of illustrating a preferred embodiment and it is to be understood that other equivalent materials and metal joining techniques, as well as scaled operating parameters and ranges of operations are within the scope of the present invention.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A high frequency electron discharge device of the backward wave oscillator type comprising, a bifilar helix slow wave structure adapted and arranged for interaction with an electron beam, a waveguide coupled to said bifilar slow wave structure through transitional coupling means, said transitional coupling means comprising a pair of coupling sections coupled to the helices of said bifilar helix at the one end portion thereof and coupled by means of oppositely directed antenna probes to the waveguide at the other end portion thereof, said oppositely directed antenna probes lying in a given transverse plane through said waveguide and transversely spaced from each other, said transitional coupling means including a pair of coaxial coupling sections coupled to the helices of said bifilar helix at the one end portion thereof and coupled to said waveguide through said oppositely directed antenna probes at the other end portion thereof, said waveguide including a reactive iris positioned therein in spaced relation from said antenna probes.

2. The backward wave oscillator defined in claim 1 wherein dielectric supporting members are positioned in said waveguide between said oppositely directed antenna probes and the respective defining walls of said waveguide towards which said probes are directed to support said antenna probes in D.C. isolation with respect to said waveguide.

3. A high frequency electron discharge device comprising, a bifilar helix slow wave structure adapted and arranged for interaction with an electron beam, a waveguide coupled to said bifilar slow wave structure through transitional coupling means, said transitional coupling means comprising a pair of coupling sections coupled to the helices of said bifilar helix at the one end thereof and coupled by means of oppositely directed antenna probes to the waveguide at the other end thereof, said transitional coupling means including coaxial coupling sections coupled to the helices of said bifilar helix at the one end thereof and coupled to said waveguide through said oppositely directed antenna probes at the other end thereof, each of said antenna probes being spaced from the central axis of said waveguide thereby facilitating the impedance match between said bifilar helix and said waveguide, said antenna probes lying in a plane which is spaced approximately $\frac{1}{2}\lambda_0$, where $\lambda_0$ is coaxial guide wavelength as measured at the center frequency of operation of said electron discharge device, from a parallel plane through the central axis of said bifilar helix.

4. A high frequency electron discharge device of the backward wave oscillator type adapted and arranged to provide cumulative interaction between an electron beam and an antisymmetric mode of propagation on a pair of bifilar helices disposed along the axis of said electron discharge device comprising, (a) first means for generating and directing an electron beam along a predetermined axis,
(b) a multifilar helix positioned along and surrounding said predetermined axis,
(c) a plurality of spaced dielectric supporting rods positioned along the axial extent of said multifilar helix along the length thereof and adapted and arranged to support said multifilar helix in a fixedly secure relationship,
(d) each of said supporting rods having a plurality of periodically spaced notches cut therein, said notches of at least one of said rods being of adequate shape and size to provide a clearance space between said rod and one of said helices of said multifilar helix, said notches of at least one other of said rods being of adequate shape and size to provide a clearance space between said rod and another of said helices of said multifilar helix
(e) and a lossy resistive material disposed on said supporting rods and said multifilar helix in the vicinity of said notches said helices being maintained in D.C. isolation in said notched regions and the respective supporting rods for each helix of said multifilar helix being maintained in D.C. isolation with respect to the supporting rods for said other helices of said multifilar helix in said notched region.

5. A high frequency electron discharge device comprising, (a) first means for generating and directing an electron beam along a predetermined axis,
(b) a multifilar helix positioned along and surrounding said predetermined axis,
(c) a plurality of spaced dielectric supporting rods positioned along the axial extent of said multifilar helix along the length thereof and adapted and arranged to support said multifilar helix in a fixedly secure relationship, (d) each of said supporting rods having a plurality of periodically spaced notches cut therein, said notches of at least one of said rods being of adequate shape and size to provide a clearance space between said rod and one of said helices of said multifilar helix, said notches of at least one other of said rods being of adequate shape and size to provide a clearance space between said rod and another of said helices of said multifilar helix, (e) and a high $\mu$ magnetically soft material surrounding said multifilar helix and said supporting rods.

6. A high frequency electron discharge device comprising, (a) first means for generating and directing an electron beam along a predetermined axis, (b) a multifilar helix positioned along and surrounding said predetermined axis, (c) a plurality of spaced dielectric supporting rods positioned along the axial extent of said multifilar helix along the length thereof and adapted and arranged to support said multifilar helix in a fixedly secure relationship, (d) each of said supporting rods having a plurality of periodically spaced notches cut therein, said notches of at least one of said rods being of adequate shape and size to provide a clearance space between said rod and one of said helices of said multifilar helix, said notches of at least one other of said rods being of adequate shape and size to provide a clearance space between said rod and another of said helices of said multifilar helix, (e) and means for supplying a differential voltage between the helices of said multifilar helix, said means comprising a voltage source connected between said helices of said multifilar helix and bleeder resistors shunted between said voltage source and a main body member surrounding said multifilar helix and said supporting rods.

7. A high frequency electron discharge device comprising, (a) first means for generating and directing an electron beam along a predetermined axis, (b) a multifilar helix positioned along and surrounding said predetermined axis, (c) a plurality of spaced dielectric supporting rods positioned along the axial extent of said multifilar helix along the length thereof and adapted and arranged to support said multifilar helix in a fixedly secure relationship.

(d) each of said supporting rods having a plurality of periodically spaced notches cut therein, said notches of at least one of said rods being of adequate shape and size to provide a clearance space between said rod and one of said helices of said multifilar helix, said notches of at least one other of said rods being of adequate shape and size to provide a clearance space between said rod and another of said helices of said multifilar helix, (e) and including means surrounding said multifilar helix and said supporting rods and forming a vacuum sealed envelope thereabout, said means comprising a main body portion having a main axial bore extending along the length thereof, said multifilar helix and said supporting rods being positioned within said main axial bore, said main body portion having an axially displaced bore extending along the length thereof and spaced from said main bore.

8. A high frequency electron discharge device comprising, (a) first means adapted and arranged to generate and direct an electron beam along a predetermined axis, (b) second means spaced from said first means along said predetermined axis adapted and arranged to dissipate said electron beam, (c) third means disposed about said predetermined axis and extending along a substantial portion of the length thereof between said first means and said second means, (1) said third means comprising a bifilar helix adapted and arranged to support electromagnetic energy thereon, (d) fourth means surrounding said third means in spaced relation therewith and forming a vacuum sealed envelope thereabout, (1) said fourth means comprising a main body portion having a main axial bore extending along the length thereof, thereby providing a first channel between said first and said second means within which said third means is positioned, said body portion being made of a high $\mu$, magnetically soft material, said main body portion having at least one axially displaced bore extending the length thereof, thereby providing a second channel between said first means and said second means spaced from said first channel, (e) four 90° space oriented dielectric rods positioned between said main body and said bifilar helix, said rods being adapted and arranged to support said bifilar helix in a fixedly secure position within said main body, each of said rods having the end portions thereof periodically notched in the vicinity of said second means, said notches of one pair of 180° space oriented rods having a shape and size adequate to clear one of the helices of said bifilar helix, said notches of the other pair of 180° space oriented rods having a shape and size adequate to clear the other of said helices of said bifilar helix, (f) fifth means partially surrounding each of said supporting rods in said notched end portion thereof, and said bifilar helix in the notched region, said fifth means comprising a lossy resistive material, (g) sixth means adapted and arranged to supply a differential voltage between said helices of said bifilar helix, said sixth means comprising a voltage source connected between said helices of said bifilar helix and a pair of bleeder resistors shunted between said voltage source to said main body, (h) seventh means positioned near said first means and adapted and arranged to couple electromagnetic energy from said bifilar helix, said seventh means comprising, a waveguide, a pair of coaxial lines coupled to said waveguide, the center conductors of said coaxial lines extending within said waveguide and terminating therein in oppositely directed antenna probes.

9. A linear beam high frequency electron discharge device of the backward wave oscillator type comprising, electron gun means disposed at the upstream end portion of said device for generating and directing an electron beam along the central axis of said device, a bifilar helix positioned along and surrounding said central axis, a plurality of spaced dielectric support rods disposed along the bifilar helix central axis for supporting said bifilar helix, each of said supporting rods having a plurality of periodically spaced notched portions, the notched portions of at least one of said rods being of adequate shape and size to provide a clearance space between said at least one rod and one of said helices of said bifilar helix, the notched portions of at least one other of said rods being of adequate shape and size to provide a clearance space between said at least one other rod and the other of said helices of said bifilar helix, a pair of coaxial line coupling sections coupled to diametrically opposed end portions of the respective helices of said bifilar helix, a waveguide coupled to said coaxial line coupling sections, said coaxial lines terminating within said waveguide in a pair of antenna probes, said pair of antenna probes being oppositely directed and lying in a single transverse plane cutting through said waveguide, said antenna probes each being displaced from each other and from the central axis of said waveguide, said coaxial lines entering said waveguide through a shorting plane disposed across the waveguide and forming an end wall portion thereof.

10. A high frequency electron discharge device comprising, first means for generating and directing an electron beam along a predetermined axis, a bifilar helix positioned along and surrounding said predetermined axis, a plurality of spaced dielectric support rods positioned along the longitudinal axis of said bifilar helix for supporting said bifilar helix in a fixedly secure relationship, each of said supporting rods having a plurality of periodically spaced notched regions, said notched regions of at least one of said rods being of adequate shape and size to provide a clearance space between said one rod and one of said helices of said bifilar helix, said notched regions of at least one other of said rods being of adequate shape and size to provide a clearance space between said one other rod and the other of said helices of said bifilar helix, the respective ends of each of said bifilar helices near said first means being provided with means for coupling electromagnetic energy propagating on said bifilar helix from said device, said coupling means including a waveguide, said waveguide being fed by a pair of approximately $\frac{1}{2}\lambda_g$ spaced antenna probes coupled to approximately 180° space oriented end portions of the helices of said bifilar helix said antenna probes being spaced approximately $\frac{1}{2}\lambda_g$ along the length or Z dimension of said waveguide, wherein $\lambda_g$ is determined at the center frequency of operation of said device.

11. The device of claim 10 wherein said waveguide has a shortening plane back wall spaced approximately $\frac{1}{4}\lambda_g$ from said one of said spaced antenna probes and a vacuum sealed waveguide window spaced from the other of said $\frac{1}{2}\lambda_g$ spaced antenna probes.

12. A high frequency electron discharge device comprising, first means for generating and directing an electron beam along a predetermined axis, a bifilar helix positioned along and surrounding said predetermined axis, a plurality of spaced dielectric support rods positioned along the longitudinal axis of said bifilar helix for supporting said bifilar helix in a fixedly secure relationship, each of said supporting rods having a plurality of periodically spaced notched regions, said notched regions of at least one of said rods being of adequate shape and size to provide a clearance space between said one rod and one of said helices of said bifilar helix, said notched regions of at least one other of said rods being of adequate shape and size to provide a clearance space between said one other rod and the other of said helices of said bifilar helix, the respective ends of each of said bifilar helices near said first means being provided with means for coupling electromagnetic energy propagating on said bifilar helix from said device, said coupling means including a pair of approximately $\frac{3}{4}\lambda_o$ coaxial coupling sections coupled to 180° space oriented ends of the helices of said bifilar helix, wherein $\lambda_o$ is coaxial guide wavelength as determined at the center frequency of the operating band of said device.

13. A high frequency coupler for a band of electromagnetic energy, comprising a waveguide, a pair of approximately $\frac{1}{2}\lambda_g$ spaced antenna probes positioned within said waveguide in D.C. isolation with respect thereto, a shorting plane terminating one end of said waveguide, said shorting plane being spaced approximately $\frac{1}{4}\lambda_g$ from one of said antenna probes and approximately $\frac{3}{4}\lambda_g$ from the other of said antenna probes, wherein $\lambda_g$ is determined at the center frequency of the band of electromagnetic energy to be coupled.

14. A backward wave oscillator electron discharge device comprising an electron gun disposed at the upstream end portion of said device for generating and directing an electron beam along a central beam axis, a bifilar helix slow wave circuit disposed along and surrounding said central beam axis, coupling means disposed at the upstream end portion of said device for extracting anti-symmetric mode electromagnetic wave energy propagating on said bifilar helix in operation, said coupling means including a pair of coaxial lines electrically coupled to the respective upstream end portions of the helices of said bifilar helix, a rectangular waveguide coupled to said pair of coaxial lines, said pair of coaxial lines terminating in said rectangular waveguide in the form of oppositely directed antenna probes which lie in a single transverse plane through said rectangular waveguide, the respective probes being directed toward the broad walls of said waveguide, said coaxial lines entering said waveguide through a shorting plane disposed across the waveguide and forming an end wall portion thereof.

References Cited by the Examiner

UNITED STATES PATENTS

| | | | |
|---|---|---|---|
| 2,064,469 | 12/1936 | Haeff | 331—82 |
| 2,695,356 | 11/1954 | Sunstein | 333—33 X |
| 2,806,975 | 9/1957 | Johnson | 315—3.6 |
| 2,846,613 | 8/1958 | Pierce | 315—3.6 |
| 2,859,375 | 11/1958 | Brewer | 315—3.6 |
| 2,909,735 | 10/1959 | Hessler | 333—33 |
| 2,927,832 | 3/1960 | Marchese | 315—3.6 |
| 2,971,114 | 2/1961 | Dow | 315—3.6 |
| 2,994,008 | 7/1961 | Geiger et al. | 315—3.5 |
| 3,121,819 | 2/1964 | Wilmarth | 315—3.6 |
| 3,193,720 | 7/1965 | Vaccaro | 315—3.6 |

OTHER REFERENCES

Wheeler, G. J.: Introduction to Microwaves—N.J., Prentice-Hall, 1963, pp. 65–67 and pp. 138–140 relied on (sections 4.8 and 8.7).

HERMAN KARL SAALBACH, *Primary Examiner.*

R. D. COHN, *Assistant Examiner.*